(12) United States Patent
Redko et al.

(10) Patent No.: US 7,845,232 B2
(45) Date of Patent: Dec. 7, 2010

(54) APPARATUS AND METHOD FOR DETERMINING SERVICE LIFE OF ELECTROCHEMICAL ENERGY SOURCES USING COMBINED ULTRASONIC AND ELECTROMAGNETIC TESTING

(75) Inventors: Volodymyr Redko, Coral Springs, FL (US); Volodymyr Khandetskyy, Dnipropetrovsr (UA); Elena Shembel, Coral Springs, FL (US)

(73) Assignee: Enerize Corporation, Coral Springs, FL (US)

( * ) Notice: Subject to any disclaimer, the term of this patent is extended or adjusted under 35 U.S.C. 154(b) by 473 days.

(21) Appl. No.: 11/890,185

(22) Filed: Aug. 3, 2007

(65) Prior Publication Data
US 2008/0028860 A1 Feb. 7, 2008

Related U.S. Application Data

(60) Provisional application No. 60/835,650, filed on Aug. 5, 2006.

(51) Int. Cl.
*G01N 29/00* (2006.01)
(52) U.S. Cl. .............................. 73/602; 73/599; 73/614; 73/616; 73/628
(58) Field of Classification Search .................. 73/602, 73/609–612, 615, 629, 631, 649, 658, 661, 73/599–600, 614, 616, 627–628
See application file for complete search history.

(56) References Cited

U.S. PATENT DOCUMENTS

| | | | | |
|---|---|---|---|---|
| 5,919,589 A | * | 7/1999 | Kawakami et al. | ........ 429/231.8 |
| 6,250,160 B1 | * | 6/2001 | Koch et al. | .................... 73/602 |
| 7,615,314 B2 | * | 11/2009 | Kawakami et al. | ........ 429/231.8 |

* cited by examiner

*Primary Examiner*—Helen C. Kwok
(74) *Attorney, Agent, or Firm*—Shariff & Yatooma PLC

(57) ABSTRACT

The present invention is an apparatus and method for determining the remaining service life of electrochemical energy generation and storage device including batteries, supercapacitors, DSSC solar cells and fuel cell. Measurements are performed by passing ultrasonic oscillations through the test object. The apparatus of the present invention comprises two arrays of transmitting and receiving ultrasonic probes between which the object being tested is affixed. Polyurethane tips are used for matching the acoustic resistance of the probes with the test object body. The apparatus positions the transmitting and the receiving probe arrays relative to each other. The calibration characteristic for determining the remaining service life of a the test object are established from the signal values from the ultrasonic probes related to the number of charge-discharge cycles obtained at various charge values. A three-dimensional approximating dependence surface is constructed using the normalized signals from the receiving probes. The average value of this surface is determined. The remaining service life of the test object is determined using a calibration curve based on the average level of the surface.

38 Claims, 6 Drawing Sheets

APPARATUS AND METHOD FOR DETERMINING SERVICE LIFE OF ELECTROCHEMICAL ENERGY SOURCES USING COMBINED ULTRASONIC AND ELECTROMAGNETIC TESTING

REFERENCE TO RELATED APPLICATIONS

Priority is claimed to co-pending U.S. Provisional Patent Application No. 60/835,650, filed Aug. 5, 2006.

FEDERALLY SPONSORED RESEARCH

None

SEQUENCE LISTING

None

FIELD OF THE INVENTION

The invention relates to the fields of electrical engineering, in particular to physical non-destructive testing of energy generating and storage devices, and especially to combined ultrasonic and electromagnetic testing of rechargeable and primary batteries, supercapacitors, solar cells and fuel cells to determine their service life.

BACKGROUND OF THE INVENTION

Among the achievements of present-day electrochemical engineering is the development and commercialization of an increasing variety of electrochemical energy generation and storage devices including high energy lithium-ion rechargeable batteries, high efficiency low cost dye sensitized solar cells (DSSC), and electric double layer capacitors (EDLC or supercapacitors).

The present invention is related to the testing of electrochemical energy generation and storage devices as defined herein including, but are not limited to, batteries, electric double layer capacitors (EDLC's or supercapacitors), certain types of solar cells such as dye sensitized solar cells, and certain fuel cell components. Illustrations of the application of the present invention to the testing of examples of these electrochemical energy generation and storage devices (electrochemical energy devices) are provided.

With time and usage, the electrochemical energy devices mentioned above undergo a reduction in performance (degraded power and energy capacity). This degradation occurs during storage and as a result of electrical energy generation, or of the charge-discharge cycling process in the case of batteries and supercapacitors.

Degradation of electrochemical energy device performance during cycling and storage is a function of numerous factors including temperature, type of electrolyte and electrode materials, discharge level, charge/discharge current values, and storage duration. Power reduction during the operating process is also an inherent feature for electrochemical energy devices According to data from Sony Corporation, for example, the capacity of their type 26650 Li-ion batteries is reduced by 20% after 500 charge-discharge cycles. The capacity loss of the cylindrical batteries type 18650 (18 mm diameter and 65 mm height) with a $LiCoO_2$ base cathode after 500 cycles is 10-18%. According to the results from studies of cylindrical (type 18650) and prismatic (type 103450) batteries produced by various Japanese and European companies, after 300 charge-discharge cycles at room temperature, the average discharge voltage has dropped by 6% while the average reduction in power for these same batteries was about 21%.

In the process of lithium-ion battery operation (cycling and storage) the positive electrode material can be subject to different conditions within the interior and on the surface that lead to a deterioration of battery performance. During operational cycling at room temperature, the relatively unstable two-phase $LiMn_2O_4$ structure transforms to a stable single-phase structure while losing $Mn^{3+}$ and forming $MnO_2$ that during lithium intercalations is transformed to an inactive $LiMnO_2$ with a lamellar structure. Certain phase changes were also observed in the material of the $LiCoO_2$ based positive electrodes. As a result, during discharge/charge processes the volume of the electrode changes.

Thus, for electrochemical energy devices that contain electrodes and electrolyte, there is a characteristic change in the volume of the electrode structure components distribution (anode, cathode, separator, electrolyte) during operation and even during storage.

In the case of rechargeable batteries, causes of reduced power and the loss of capacity during the cycling process may include the following:
- changing of the structure, composition and increasing of the solid electrolyte layer thickness of the surface of electrodes;
- change the volume of the electrode structure components distribution (anode, cathode, separator, electrolyte)
- changing of the separator properties;
- increasing of the gaseous phase concentration in the electrodes material accompanied by the active mass loosening;
- forming and disarrangement of the $LiCoO_2$, $LiMnO_2$ laminar structures on the electrodes;
- appearing of multitudes of cracks, pores, laminations in the particles of the electrode coating materials;
- deactivating of the graphite particles by surface films that increase in thickness due to solvent co-intercalation and insulating of the graphite particles;
- increasing of the passive film thickness on the negative carbon electrode surface as a result of the electrical regeneration of the electrolyte;
- increasing of the passive film thickness on the aluminum current outlets between the aluminum and cathode active mass.

As will be clear to one skilled in the art, the methods, apparatus and techniques disclosed in this patent can be used for analogous testing of other electrochemical energy devices having electrodes and electrolytes. These include, but are not limited to, supercapacitors, DSSC solar cells and fuel cell components.

Analysis of the patents dealing with determining electrochemical energy device service life has shown that there are no patents wherein the remaining service life is determined using combined ultrasonic and electromagnetic test methods. The review of the main causes of the power and reversible capacity reduction in electrochemical energy devices during cycling indicates that the capability to carry out effective ultrasonic and electromagnetic testing of electrochemical energy devices for determining the remaining service life would be of great advantage.

SUMMARY OF THE INVENTION

The present invention involves the use of combined ultrasonic and electromagnetic testing to determine the remaining service lifetime of electrochemical energy generation and storage devices. This general method and apparatus could be applied to determining the remaining service life of devices with components that employ electrolytes and electrodes, such as rechargeable batteries, fuel cells, DSSC type solar cells and especially supercapacitors. In the following description, the term "test object" is used to denote an electrochemical energy generation or storage device that is being analyzed by the apparatus and methods of the present invention.

According to the present invention, transmitting and receiving ultrasonic probes (transducers) are arranged as separate arrays in relation to the test object. The transmitting probes are arranged so that their bases lie in the same plane. The probes are cylindrically shaped. The cylinder generatrix is perpendicular to the plane in which the bases of the probes lie. The receiving ultrasonic probes are similarly arranged within their respective array. The transmitting and the receiving probes are arranged in the planes of their respective arrays in the tops of the squares having identical dimensions.

For maintaining acoustic contact of the ultrasonic probes with the body of a flat battery fixed between the transmitting and the receiving probe arrays, the probes are fitted with polyurethane tips. To provide the necessary accuracy for the ultrasonic measurements it is necessary to combine the pairs of the transmitting and the receiving probes so that their axes of symmetry are coincident.

To this end, a positioning system comprising four transformer probes is used. The induction/excitation coils of these probes are arranged in the corners of the receiver array while the sensing coils are in the corners of the transmitting array. The coils are arranged as shown in FIGS. 1 and 8, and they are inductively coupled through the air.

The positioning system also contains mechanical means that performs radial movement of the arrays relative to one another within a specific distance interval, and electronic means indicating the required direction of the movement to co-axially arrange all the pairs of the transmitting and the receiving ultrasonic probes. The excitation and the sensing induction coils are so arranged such that the co-axial position of their axes corresponds to the co-axial arrangement of the axes of all the pairs of the transmitting and the receiving ultrasonic probes. When the co-axial arrangement of the excitation and the sensing coils is achieved during their radial movement the mutual induction reaches its maximum, and the maximum voltage in the sensing coil is observed (FIG. 2). When the maximums coincide on all the four sensing coils, all the pairs of the transmitting and the receiving ultrasonic probes are co-axial.

At the same time, when the excitation and the sensing coils are co-axial, the maximum voltage value of the sensing coil depends on the distance between the operating end faces of the coils. Hence, the distance between the transmitting and the receiving arrays can be determined from the maximum voltage value of the sensing coils in the positioning system of the ultrasonic probes.

The polyurethane tips of the ultrasonic probes are resilient. Depending on the initial characteristics of the polyurethane, operating time and probes storage conditions, and environment temperature and humidity during the operation process, the resiliency of the tip varies. Therefore, even at the constant force at which the probe is pressed to the outer body of the battery the height change of the polyurethane tip will not always be identical.

Hence, for determining the test object thickness for the subsequent rating of the pulse amplitudes of the receiving ultrasonic probes as related to the test object thickness, high-frequency eddy current sensors are used in the form of short cylindrical induction coils.

One such coil is fixed in the center of the transmitting array, and the other is fixed in the center of the receiving array. Change in the coil inductance is a function of the clearance value between its operating end face and the surface of the battery metallic body. Thus, using the maximum values of the signals of the sensing coils in the orientation system and the signals of the clearance measurement of the eddy current sensor, it is possible to determine the test object thickness. The value of the signals from the receiving ultrasonic probes can be calibrated as a function of the thickness of the test object.

Commutation or alignment of the transmitting ultrasonic probes is effected in series, along each array line. The signals of each receiving probe in the array are compared to all the neighboring probe signals that are arranged at a distance apart on the side of the square upon the grid of which the ultrasonic probes are arranged. Based on the comparison results, an operating group (set) of the pairs of transmitting and receiving probes are selected that to provide a sounding (image) of the operating region inside of the test object. In such case from the total number of the probe pairs, those pairs are excluded which are located beyond the test object limits. In this case the acoustic resistance values between the transmitting and the receiving probes are high. Additionally probe pairs are also excluded that are located close to the lateral edge of the battery, within the edge effect influence zone.

In the case of batteries and supercapacitors, for example, the number of the charge-discharge cycles undergone from the start of its operation is determined according to the present invention using a calibration chart. The following sequence of operations is used to obtain such a calibration chart.

From a group of test objects of a given type, a calibration group (set) is formed comprising a minimum of 10 units. All these units are subjected to cycling. In the case of lithium ion batteries, for example, after each cycling stage, comprised of 50-100 charge-discharge cycles, the battery is subjected to ultrasonic testing that is carried out at different battery charging voltages.

The charge voltage values are ordered uniformly within the range from a fully discharged battery to fully charged battery, and do not change from one cycling stage to the other. For each battery in the calibration group, after each cycling stage, and for each charge voltage, the average signal value is determined in the operating group of the receiving probes. The average squared error value for the whole battery formed by all the probes of the operating group is determined.

If the value of the average squared error for the given battery after any cycling stage and at any charge voltage exceeds 10%, then this battery is excluded from the calibration set. This is because it demonstrates an unacceptably high variance of property or parameter values within the operating range.

For each battery that remains in the calibration group, a dependence curve is constructed from the averaged signal of the operating group of probes relative to the number of the cycling stages for each discharge voltage value. The correlation coefficient and the average slope of these "dependency curves" are determined. A curve with the maximum average slope is selected, the correlation coefficient of which is not less than 0.85.

Similar dependencies are compared that were obtained for all the batteries of the calibration group. The dependence with the maximum average slope is selected, and the corresponding charge voltage is recorded as the calibrating value. The selected dependence is subsequently used to determine the number of cycles achieved by a given battery from the beginning of its operation.

Before testing a given battery, its discharge voltage is set to the calibration value. Then a three-dimensional approximating dependence (regression surface) is formed on the basis of the normalized signals of the operating group of the receiving ultrasonic probes bound to the Cartesian coordinates of these probes in the plane of the battery being studied using the least squares method. The average level (value) of this surface is determined. If the values of the signals of the receiving ultrasonic probes in the extreme points exceed the 30% deviation limits from the average level, then the remaining battery lifetime is determined from the minimum regression surface.

If the deviation range of the signals is not so large, to determine the remaining lifetime the average value of the signals of the operating group of probes is used. In this case the remaining number of the discharge-charge cycles is determined for a given battery by subtracting the number of the recharge cycles that it achieved from the beginning of its operation from the normalized (certified) value for the given type of the rechargeable battery.

DETAILED DESCRIPTION OF THE INVENTION

Figure 1:
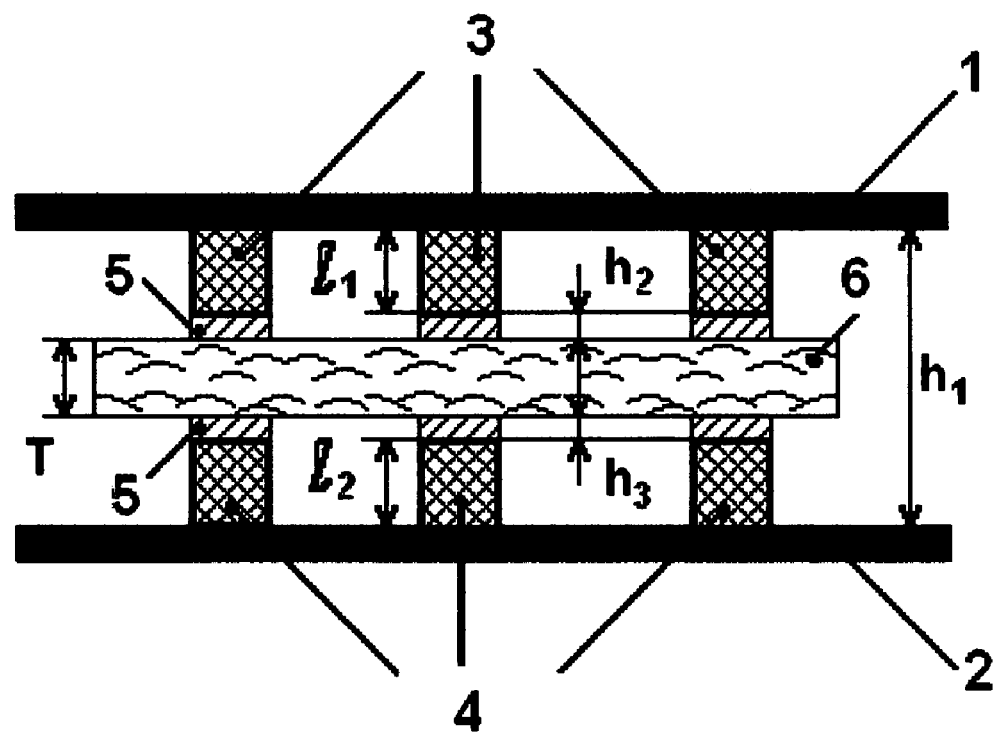
FIG. 1. Set-up for determining the thickness of a test object arranged between the arrays of the transmitting and the receiving ultrasonic probes:
- 1—transmitting probe array, 2—receiving probe array, 3—transmitting ultrasonic probes, 4—receiving ultrasonic probes, 5—polyurethane tips on operating end faces of transmitting and receiving probes, 6—test object being measured.

The present invention is an apparatus and method for determining the remaining service life of electrochemical energy generation or storage devices. As defined herein such devices include, but are not limited to, batteries, electric double layer capacitors (EDLC's) or supercapacitors, and certain types of solar cells such as dye sensitized solar cells. Testing is carried out using an array of transmitting and receiving ultrasonic probes (transducers).

Data illustrating the application of the present invention to the testing of examples of these electrochemical energy generation and storage devices is provided. In the general description of the apparatus and method of the present invention, a lithium ion battery is used as the test object to illustrate operation, features and advantages of this invention. It will be apparent to one skilled in the art that other electrochemical energy generation devices and components including solar cells, fuel cell membranes, and especially supercapacitors, have many of the components and properties of lithium ion batteries and can be tested in the same way. An specific application example is also provided wherein a dye sensitized solar cell is used as the test object.

The bases of the cylindrically shaped ultrasonic transmitting probes are fixed on a plate that forms the base of the array. The probes are arranged at the vertexes of identical dimension squares and are thus arranged at an equal distance from one another.

The axes of the cylindrical probes are perpendicular to the base. The receiving probes are similarly fixed on their respective bases. In this case the distance between the symmetry axes of the ultrasonic probes in the plane parallel to the base does not exceed the probe diameter by more than 2 times.

A rectangular (prismatic) battery is arranged on the receiving array probes so that the lateral edges of the battery are parallel to the lines connecting the symmetry centers of the probes. The array of the transmitting probes is placed on the top of the flat battery plane using the guides fixed on the array of the receiving probes perpendicularly to the bases thereof.

To facilitate installation of the arrays of the transmitting probes on the guides taking into account possible misalignment, the corresponding apertures in the base of the transmitting array should exceed the diameter of the guides. After the installation, this feature allows radial movement or displacement of the of the transmitting probes relative to of the receiving probes within a range that equals the difference between the radius of the corresponding aperture and the radius of the generatrix. This will lead to substantial measurement errors. Therefore, according to this invention, a positioning means for the array of the transmitting ultrasonic probes relative to the array of the receiving probes is used within the possible displacement range.

The sensing elements of the positioning system for the transmitting and the receiving arrays are comprised of a four transducer probes, each consisting of an excitation and a sensing induction coil. The induction coils are cylindrically shaped and contain ferrite cores. The excitation coils are arranged at the corners of the transmitting array which, during the positioning process, is displaced or shifted relative to the receiving array, while the sensing coils are at the corners of the receiving array.

The coils are arranged externally to the battery so that the battery body does not influence the inductive effect (value) between these elements. When the arrays are precisely coincident, and the symmetry axes of all the pairs of the transmitting and the receiving ultrasonic probes coincide, then the symmetry axes of all the four pairs of the exciting and the sensing induction coils are also coincident. In such case the mutual induction value between the coils of each pair is at its maximum, and the voltage value of the sensing coil of each pair is also at its maximum. The respective calculations are given in Example 1.

The positioning means also includes a mechanism for shifting or displacement of the transmitting array relative to the receiving array in the plane perpendicular to the guides, within the specified range of movement. To indicate the direction of the required movement or displacement, electronic means are used that record the voltage change gradient of each sensing coil during the shift process. The moment when all four pairs of the excitation and the sensing induction coils become coaxial, and, correspondingly, all the pairs of the transmitting and the receiving ultrasonic probes become coaxial, is recorded by the electronic means according to the principle of coincidence of the voltage maximums on all the four induction sensing coils.

All excitation coils are connected in parallel to the output of the oscillator. To avoid any commutation related interference, a metering circuit is switched to each sensing induction coil.

Acoustic impedance matching of the ultrasonic probes and the object being tested is most often achieved by using immersion liquids (various oils, water, etc.) or transition media having resilient properties. In the present invention, the use of liquids is not practical when probing charged batteries, because, penetrating into the battery or spreading over the surface a liquid can short-circuit the oppositely charged electrodes and thus spoil the battery. A "dry" coupling of the ultrasound to the battery is the only practical option in such a situation. To this end, the present invention uses polyurethane tips that are glued to the operating end faces of the ultrasonic probes.

The tips are made of polyurethane of 18-20 Shohr's hardness units, and are glued to the operating end face of the ultrasonic probe with a polyurethane adhesive. The latter provides an acoustic transparency of the tip to probe's operating surface interface. In other words, its function is to eliminate any ultrasonic pulses reflection from that interface. The polyurethane tips have the shape of short cylinders of identical diameter and height while the diameter of the tips equals the diameter of the probes, and the height of the tips in their initial state equals 3-6 mm.

The operation experience shows that flat or prismatic batteries of the same type differ in thickness even in their initial state. In addition, the battery thickness may change during the operation. To be able to correctly compare the ultrasonic measurement results, they must be normalized to the battery thickness. In such case the battery thickness is to be measured in the operating condition of the battery when it is placed between the arrays of the transmitting and the receiving ultrasonic probes. This will result in a higher accuracy of the thickness measurement. It allows the use of non-contact eddy current sensors, allows automation of the process of measurements and calculations of the normalized ultrasonic signals.

The voltage value of the sensing coil in the positioning system, when the excitation and the sensitive coils are arranged coaxially, depends on the distance between their end faces. A corresponding calculation is given in Example 2. The polyurethane tips of the ultrasonic probes are resilient.

Depending on the initial characteristics of the polyurethane, probe operating time and storage conditions, environmental temperature and humidity, the resilient properties of the tips during the operating process vary. Therefore, even under a constant force of pressing the probe to the outer surface of the battery, one cannot consider that the height change of the polyurethane tip will always be identical.

Under such conditions, in order to determine the battery thickness, it is necessary to measure the height of the polyurethane tips in the operating state, when the array of the transmitting probes is positioned on the top of the flat surface of the battery that lies on the array of the receiving probes, as shown in FIG. 1. Here $h_1$ is the distance between the bases of the transmitting and the receiving arrays; $h_2$ and $h_3$ are the heights of the resilient polyurethane tips in the operating state; $l_1$ is the height of the transmitting ultrasonic probe body; $l_2$ is the height of the receiving ultrasonic probe body; ($l_1=l_2=l$); T is flat (prismatic) battery thickness. According to FIG. 1 the battery thickness is determined as follows:

$$T=h_1-2\cdot l-(h_2+h_3). \quad (1)$$

Value $h_1$ is derived from the voltage maximum values of the sensing coils in the positioning system when they are coaxial. Values $h_2$ and $h_3$ are measured by the eddy current sensors arranged centrally in the transmitting and the receiving arrays, while value l is constant and known.

The battery thickness measuring means include two flat miniature platforms made of high-frequency dielectric, for example, of glass fiber laminate, one of the platforms being fixedly arranged between the four transmitting ultrasonic probes located in the vertexes of the central square of the array while the other platform is located between the similar receiving ultrasonic probes. The plane of each platform is perpendicular to the generatrices of the cylindrical probes or parallel to the bases of the arrays. In the center of each platform an eddy current sensor is fixedly arranged in the form of a short cylindrical induction coil, the generatrix of the coil cylinder being perpendicular to the platform plane. Both coils are identical.

Additionally, on the platform are fixed: a capacitor that forms, together with the coil, a parallel oscillatory circuit, and a communication element with a high-frequency oscillator. To each resonant circuit a metering circuit is connected, the output signal of which is a function of the gap value between the operating end face of the induction coil (eddy current sensor) and the surface of the metallic foil forming the body of the battery.

The output signals of the voltage measuring circuits that are connected to each sensing coil of the positioning system are converted to a digital form by means of an analog-to-digital converter. The voltage maximums on the sensing coils that are being recorded when the excitation and the sensing coils of the positioning system become co-axial, are averaged. The averaged signal value, taking into account the height of the excitation and sensing coils, each being affixed on the base of the corresponding array, is used for determining the distance between the arrays ($h_1$ in FIG. 1).

The output signals of the measuring circuits connected to the resonant circuits of the eddy current sensors are converted to a digital form by means of an analogue-to-digital converter. Using these signals the computing device of the apparatus determines the gap values between the operating end faces of the high-frequency induction coils (eddy current sensors) and the metallic foil surfaces on the opposite sides of the flat battery ($h_2$ and $h_3$ in FIG. 1). The dependence of the inductance change of the eddy current sensor on the gap is illustrated in Example 3.

A metering circuit is connected to each receiving ultrasonic probe. Each of the transmitting ultrasonic probes is connected to output of the excitation signal generator. The transmitting ultrasonic probes are connected, in sequence along each array line with the signals of the transmitting ultrasonic probes being converted to a digital form and stored.

The thickness-normalized digital signal of each receiving ultrasonic probe in the array is compared to the signals of all the neighboring probes located at a distance equal to the side length of a square. The probes can be subdivided into three groups. The first group includes the probe pairs located externally of the battery. The transmitting and the receiving probes of this group are separated by an air gap (with high acoustic resistance), therefore the amplitude of the ultrasonic pulses on the receiving probes is negligible.

The second group includes pairs of probes that contact the battery body via the matching polyurethane tips. This group is an operating unit that features much higher amplitude of ultrasonic pulses on the receiving probes. The third group is comprised of pairs of probes arranged within the lateral edge of the battery in the edge effect zone. The group occupies an intermediate position between the first and the second groups. Based on the signals comparison results of the receiving ultrasonic probes the second group of probe pairs is selected that performs the direct probing of the operating field of the battery excluding from the overall probe package the pairs that belong to the first and the third groups.

The remaining lifetime of the rechargeable battery is determined using a calibration chart. For plotting such a chart from a group of batteries of the given type an optional calibration group is selected containing at least 10 batteries. Each of these batteries is subjected to cycling under identical conditions. After each cycling stage comprised of a constant number (50-100) of battery charge-discharge cycles the normalized signals are determined of the operating group of receiving probes at different battery charge values. The number of the charge voltage gradations after each cycling stage is not more than 10, while the charge voltage values are uniformly arranged within the range from the fully discharged to the fully charged state of the battery. These gradations are not changed from one cycling stage to the other.

For each battery of the calibration group after each cycling stage at each charge voltage, the average signals value of the operating group of the receiving ultrasonic probes is determined, as is the mean square error value for the given battery. This value characterizes the signal value spread of the receiving probes within the operating range of the given battery caused by differences in battery properties. After that a two-dimensional set of root mean square errors is formed for each battery. The lines in the set correspond with the sequence of the cycling stages while the columns correspond to the sequence of the charge voltages after each stage. An analysis of the components of this set is carried out. The values of the mean square errors above 10% are selected and the corresponding batteries are excluded from the calibration group as lacking uniformity.

For each battery that remained in the calibration group a family of dependencies is created from the averaged signal of the operating group of probes on the number of the cycling stages for each charge voltage value. The correlation coefficients and the average slope of these dependencies are determined. From the group of dependencies with a correlation coefficient not lower than 0.85 the dependence with the highest average slope is selected. The similar dependencies obtained for all the calibration groups are compared to each other, the dependence with the maximum average slope is selected and its corresponding charge voltage is recorded as a calibration value. The selected dependence is subsequently used for determining the number of cycles endured by the battery under testing from the beginning of its operation.

Before studying the test object battery, it is connected to the charge-discharge source of the apparatus and the battery charge voltage is set to the calibration value. A three-dimensional approximating dependence or regression surface is then constructed. This is done using the normalized signals of the operating group of the receiving ultrasonic probes bound to the Cartesian coordinates of these probes in the plane of the battery under study by the least-squares method. The x and y axes lie in the battery surface plane while the battery thickness-normalized signals of the receiving ultrasonic probes are recorded on z axis.

The average level of the surface of regression is determined. If the signal values of the receiving ultrasonic probes in the surface extremum points go beyond 30% deviation from the average level then the remaining battery lifetime is determined according to the surface regression minimum. If the spread of the signals is not so large to determine the remaining lifetime the average signals value of the operating group of probes is used. Based on this average value and using the calibration dependence the number of the charge-discharge cycles is determined which the battery endured from the start of its operation. In such case the remaining number of charge-discharge cycles for the given battery, that is the actual remaining lifetime is determined by subtracting the number of the recharge cycles which it achieved from the start of its operation, from the normalized value for the given type of rechargeable batteries.

Figure 8:
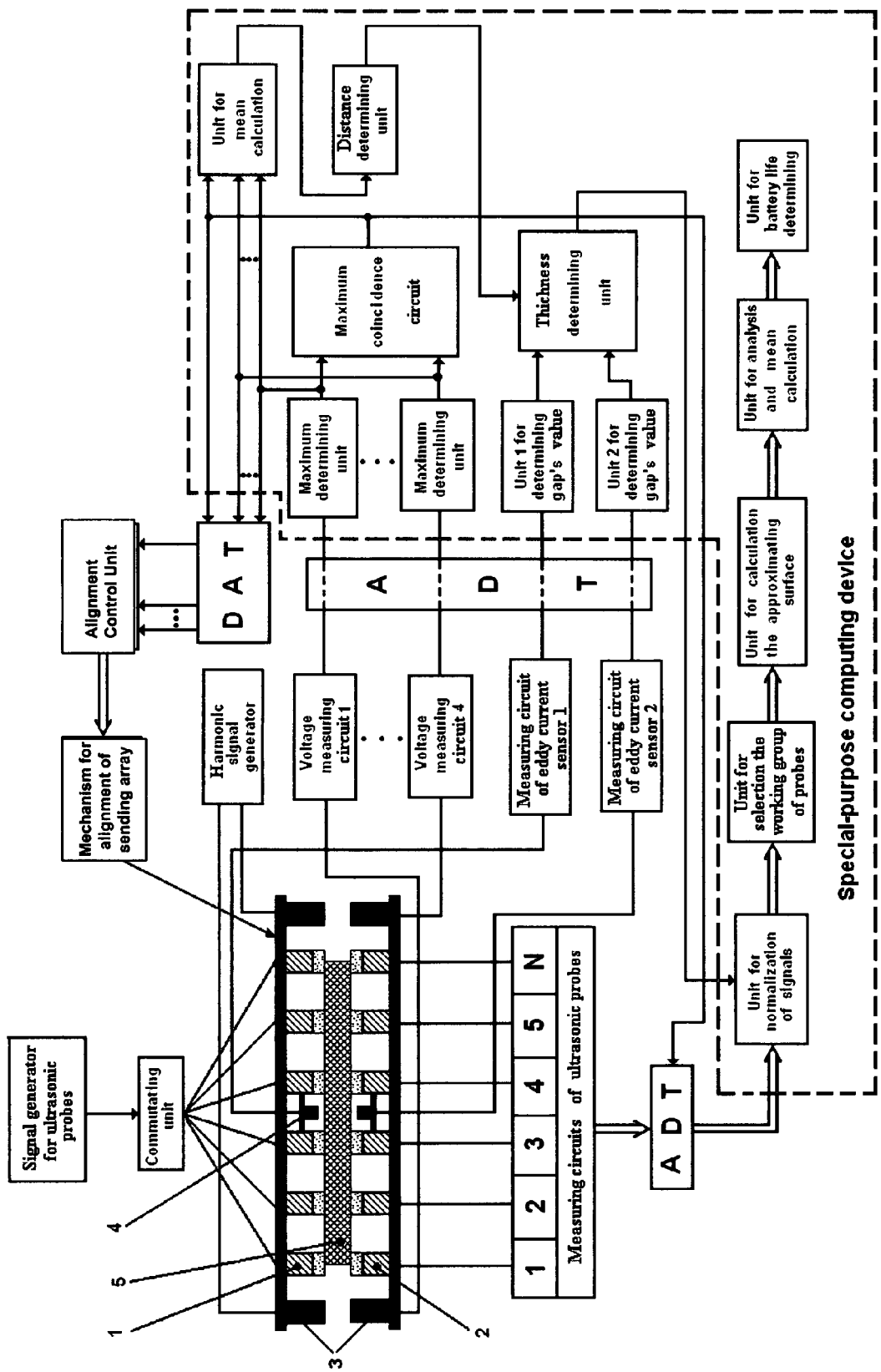
FIG. 8. Functional diagram of the apparatus for determining the remaining lifetime of a test object by ultrasonic testing:
- 1—transmitting ultrasonic probe, 2—receiving ultrasonic probe, 3—pair of excitation and sensing coils, 4—eddy current sensor, 5—test object being measured.

In the diagram shown in FIG. 8, elements 1 and 2 designate the transmitting and receiving ultrasonic probes correspondingly; 3 is the exciting and the sensing coils of the positioning system, 4—is one of the two eddy current sensors in the gap, and 5 is the test object (in this case a battery).

The transmitting ultrasonic probes are connected to the excitation signal generator via a commutation or alignment circuit. To each receiving ultrasonic probe a measuring circuit is connected whose output voltage is proportional to the amplitude of the ultrasonic pulse that passed through the battery thickness and that is excited by the corresponding transmitting probe.

Four excitation coils of the orientation system that are arranged in the corners of the transmitting array are connected to the harmonic signal generator. A measuring circuit is connected to each sensing coil of the orientation system.

The measuring circuit of each eddy current sensor of the gap includes a high frequency harmonic signal generator that is connected to the resonant circuit of the sensor via a communication unit, and a circuit for measuring the voltage of the resonant circuit.

The output signals of the circuit for measuring the voltage of the sensing coils in the positioning system and of the measuring circuits of the eddy current sensors are converted to a digital form by means of the analogue-to-digital converter and are fed to a special-purpose computing device. The functional blocks of the of the special-purpose computing device limited by the dotted line frame in FIG. 8 can be implemented by means of hardware, software and by a combination thereof using microprocessor means.

The maximum determining units determine the maximum signal values of the of the sensing coils in the positioning system during the shift of the transmitting array relative to the receiving array in the plane that is parallel to the plane of the arrays within the limits of the specified shift range. The output signals of the blocks for determining the maximum are fed in parallel to the inlets of the digital-to-analog converter, the averaging unit and to the inlets of the coincidence circuit.

The digital-to-analog converter converts the digital signals of the maximum determining unit to an analog form and feds them to the positioning control and indicating unit, said unit being used for controlling the positioning mechanism of the transmitting array relative to the receiving array in the plane that is parallel to the plane of the arrays within the specified range limits.

The coincidence circuit records the moment when the signal maximum is reached for all the four sensing coils in the positioning system. The corresponding output signal of the coincidence circuit is fed via the digital-to-analogue converter to the unit for controlling and indicating the movement direction required. In such case the shift (displacement) mechanism is used for recording the position of the transmitting array relative to the receiving array. In this position of the arrays, all the pairs of the transmitting and the receiving ultrasonic probes become co-axial.

The output signal of the coincidence circuit is fed to the control inlet of the unit for mean calculation, while the averaging unit calculates the mean arithmetic value of the maximum signals of the four sensing coils in the positioning system. According to the average arithmetic value the distance determination unit calculates the distance between the arrays of the transmitting and the receiving ultrasonic probes $h_1$ (see FIG. 1).

The units 1 and 2 for determining gap value calculate the values of the clearances $h_2$ and $h_3$ (see FIG. 1). These signals, together with the output signal of the distance determining unit are fed to the flat battery thickness T determination unit in conformity with the expression (1).

The output signal of the coincidence circuit is fed to the control inlet of the analog-to-digital converter of the signals of the measuring circuits of the receiving ultrasonic probes. When all the pairs of the transmitting and the receiving ultrasonic probes become co-axial the output signals of this analog-to-digital converter are normalized against the battery thickness in the unit for normalization of signals. Then in the unit for selection the working group of probes signals of all the receiving ultrasonic probes are compared and those pairs of the probes are selected that perform scanning of the operating region of the battery.

A three-dimensional approximating dependence (surface) or surface regression is built in the unit for calculating the approximating surface on the basis of the signal values of the receiving ultrasonic probes. The unit for analysis and mean calculation determines the average level of this surface and the values of its extreme points. If the extreme values do not exceed the 30% deviation from the average level then the value that corresponds to this average level is fed to the inlet of the battery life determination unit. If the extreme values of the surface are beyond the 30% deviation then the value that corresponds to the overall minimum of the regression surface is fed to the inlet of the battery life determination unit.

The remaining lifetime of a rechargeable battery is determined using the preliminary obtained calibration characteristic. Prior to testing, a given battery it is charged to its calibration value. The corresponding device uses a conventional circuit and is not shown in FIG. 8. The remaining number of the battery charge-discharge cycles is determined by the battery life determining unit by subtracting the number of the recharge cycles achieved by the battery from the start of its operation. This is determined while using the calibration characteristic from the normalized (certified) value for the given type of rechargeable batteries.

EXAMPLE 1

This example deals with the study of mutual induction changes in cylindrical coils of the orientation system that have parallel axes oriented in the direction of y during the shift of the coils in the radial direction along the axis x. The coils have an identical diameter d and an identical length $a=2d$, the distance between their adjacent end faces along the axis y is equal to d. The number of windings in the coils is identical and equals W. The mutual induction value M in conformity with [17] is calculated for our coils according to the formula:

$$M = \eta\left(\frac{x_1}{b_1} - \frac{x_2}{b_2} - \frac{x_3}{b_3} + \frac{x_4}{b_4}\right), \quad (2)$$

where $\eta = \pi\mu_0 W^2 d/256$, $$X_k = \begin{bmatrix} 1 - \frac{1}{4}K_1\xi_k^2 P_2(\gamma_k) + \frac{1}{8}K_2\xi_k^4 P_4(\gamma_k) - \\ \frac{5}{64}K_3\xi_k^6 P_6(\gamma_k) + \frac{7}{128}K_4\xi_k^8 P_8(\gamma_k) - \ldots \end{bmatrix},$$

$\xi_k = \frac{d}{2b_k}, \gamma_k = \frac{c_k}{b_k}, b_k = \sqrt{x^2 + c_k^2}, c_1 = y - a, c_2 = c_3 = y, c_4 = y + a;$ $K_1 = 1 + \delta^2,$ $K_2 = 1 + 3\delta^2 + \delta^4,$ $K_3 = 1 + 6\delta^2 + 6\delta^4 + \delta^6, \ldots,$ $K_n = F(-n-1, -n, 2, \delta^2);$ $\mu_0 = 4\pi \cdot 10^{-7}$ Henry/m is magnetic permeability in vacuum, $\delta=1$, F is a hyperheometrical function, $P_2(\gamma_k) \ldots P_8(\gamma_k) \ldots$ are Legandre's polynomials.

Figure 2:
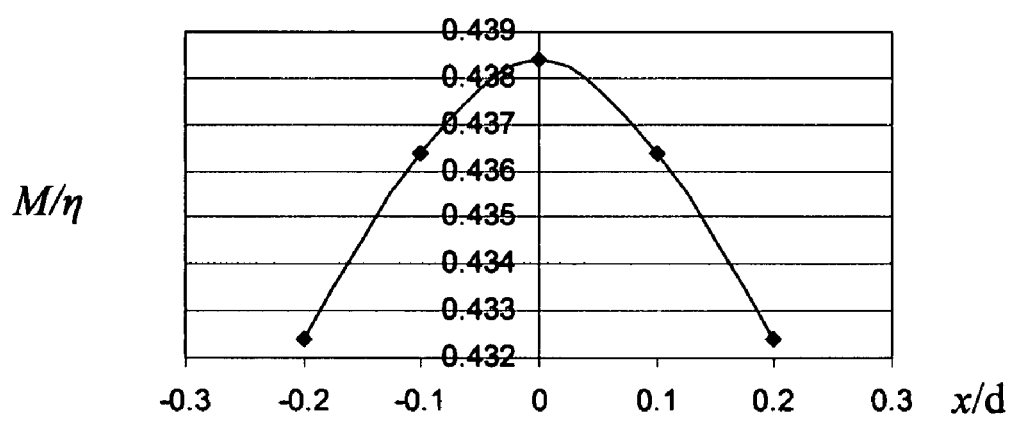
FIG. 2. Dependence of normalized mutual induction $M/\eta$ ($\eta$ described in (2)) of the excitation and sensing induction coils of the orientation system on the radial mutual movement of the axes of the coils.

The graphical dependence of the mutual induction value M rated against $\eta(2)$, on the value of the relative radial shift $x_r = x/d$ is given in FIG. 2. The dependence has a vividly expressed maximum at point x=0, where the symmetry axes of the exciting and the sensing induction coils coincide.

EXAMPLE 2

In the second example a calculation is shown of the relative mutual induction value $M/\eta$ for the orientation system coils whose parameters are described in Example 1, when the coils are brought nearer or further relative to each other along axis y. The coils are arranged co-axially to each other, that is the value of the radial shift x=0. The change of $M/\eta$ is calculated as a function of the relative clearance value between the nearest end faces of the coils $h_r=h/d$, where d is the diameter of the coils. Formulas (2) were used for the calculations. The corresponding dependence is given in FIG. 3.

Figure 3:
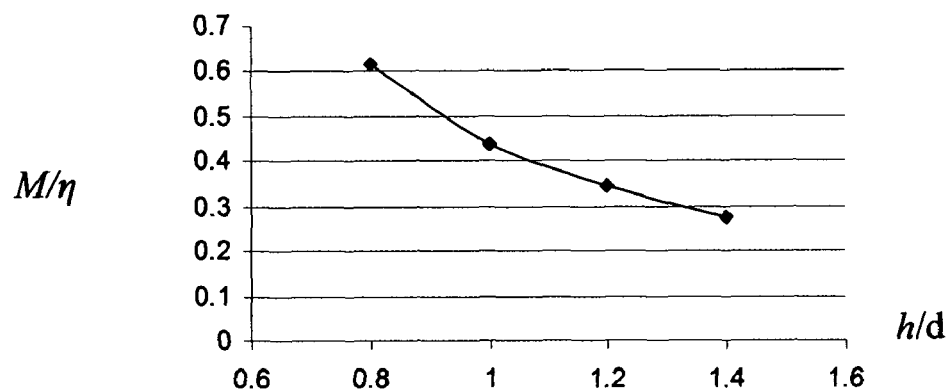
FIG. 3. Dependence of normalized mutual induction $M/\eta$ ($\eta$ described in (2)) of the excitation and sensing induction coils of the orientation system during their coaxial arrangement on the distance between end faces of the coils.

The graph in FIG. 3 shows that with the increase of the distance h between the end faces of the co-axially arranged coils of the orientation system the mutual induction value M decreases monotonously. Hence, by measuring the voltage on the sensing coil of the orientation system that is proportional to the mutual induction value of the exciting and the sensing coils, it is possible to determine the distance between the end faces of these coils and, correspondingly, the distance $h_1$ between the bases of the arrays of the transmitting and the receiving ultrasonic probes (see FIG. 1).

EXAMPLE 3

This example shows the dependence calculation of the introduced eddy current probe inductance used for measuring the gap between its operating end face and the metallic foil surface of the battery body as a function of the gap, for example $h_2$ in FIG. 1. An eddy current probe is used as a component part of the means for measuring the flat battery thickness between the arrays of the transmitting and the receiving ultrasonic probes.

It is known that the influence of the gap between the operating end face of the eddy current probe in the form of a short cylindrically shaped induction coil and the thin conducting plate on the value of the introduced impedance of the probe is described by an exponential cofactor [18]:

$$Z_{ad} = 48 \cdot 10^{-7} \varpi RW^2 e^{-\frac{3h}{R}} \frac{\beta^2 th\left(\frac{\zeta}{4}\sqrt{9+j \cdot 4\beta^2}\right)}{3\sqrt{9+j \cdot 4\beta^2} + (9+j \cdot 2\beta^2) th\left(\frac{\zeta}{4}\sqrt{9+j \cdot 4\beta^2}\right)}, \quad (3)$$

where $Z_{ad}$ is the value of the introduced impedance of the eddy current probe, ω—frequency, R—probe radius, W—number of windings, h=$h_2$—gap value, $\beta = R\sqrt{\omega\sigma\mu_0}$, σ—specific electrical conductivity of the plate material, $\mu_0$—magnetic permeability in vacuum, $\zeta = 2t/R$, where t—plate thickness, th—symbol of the hyperbolic tangent.

As it is seen from formula (3) the cofactor $e^{-3h/R}$ is common for both the actual and the imaginary part of the introduced impedance.

The penetration depth of the flat electromagnetic wave into the aluminum foil of the battery body is calculated by the formula:

$$\delta = \sqrt{\frac{2}{\omega\sigma\mu_0}}, \quad (4)$$

at a frequency f=50 MHz is equal to $11.6 \cdot 10^{-6}$ m. Hence, at this depth the field intensity is attenuated by e times. When passing through the aluminum foil of the battery body of thickness $T=50 \cdot 10^{-6}$ m the field gets attenuated by more than 12 times.

Figure 4:
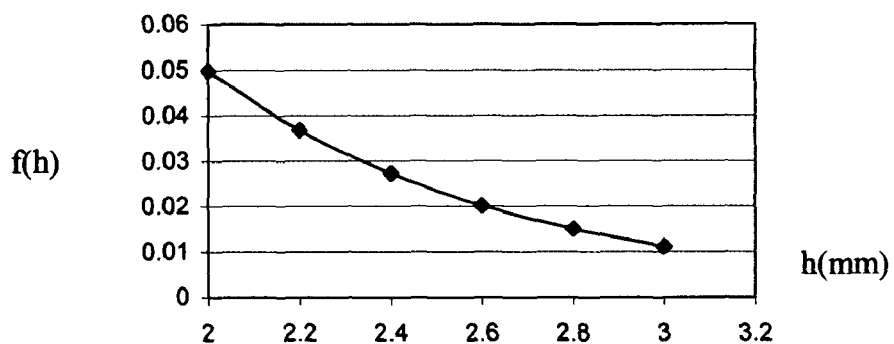
FIG. 4. Dependence of relative inductance of eddy current probe on the clearance value (distance or stand-off) between probe working end face and metallic foil surface forming the battery body.

The generalized parameter value β (3) for a 4 mm diameter probe, of the specific electrical conductivity of aluminium $\sigma = 37 \cdot 10^6$ 1/Ohm·m and field frequency f=50 MHz equals 240. At such value of β the value of the actual part of the introduced impedance of the eddy current probe is quite small. Therefore, as the parameter of the probe for measuring the clearance value between the operating end face and the surface of the aluminum foil it is reasonable to use the imaginary part of the introduced impedance rated to the own impedance of the probe or, in other words, $L_{ad}/L_0$, where $L_{ad}$ is the introduced inductance, $L_0$—the own inductance of the probe. FIG. 4 shows the dependence of the relative introduced inductance of the eddy current probe $L_{ad}/L_0$ on the gap value h between the operating end face of the probe and the surface of the metallic foil that forms the battery body. The dependence is built within the range of the gap value change from 2 to 3 mm.

From the graph in FIG. 4, it follows that the value of the relative introduced inductance of the eddy current probe is monotonously dependent on the gap value and within the 2-3 mm range it practically gets attenuated by 5 times.

EXAMPLE 4

This example describes the present invention as applied to a rechargeable battery, type 1UF10345OP-OS2, selected from a batch (part# 21-52319-01) from the "Symbol" Company (Japan). The data obtained are presented in Tables 1-3, where W is the number of battery charge-discharge cycles, A(dB)—amplitude of the ultrasonic signal that passed through the thickness of the battery, and $U_i(V)$ are the battery charge voltage.

TABLE 1

| $U_i(V)$ | | | | | | | | | |
|---|---|---|---|---|---|---|---|---|---|
| 3.0 | | 3.1 | | 3.2 | | 3.3 | | 3.4 | |
| A, dB | W | A, dB | W | A, dB | W | A, dB | W | A, dB | W |
| — | 140 | — | 140 | — | 140 | — | 140 | — | 140 |
| — | 158 | — | 158 | — | 158 | — | 158 | — | 158 |
| — | 175 | — | 175 | — | 175 | 73.5 | 175 | 73.9 | 175 |
| — | 190 | 69.6 | 190 | 69.6 | 190 | 69.6 | 190 | 69.7 | 190 |
| — | 220 | — | 220 | — | 220 | — | 220 | — | 220 |
| 68.6 | 280 | 68.6 | 280 | 68.7 | 280 | 68.8 | 280 | 69.2 | 280 |
| — | 353 | — | 353 | — | 353 | — | 353 | — | 353 |
| — | 413 | — | 413 | — | 413 | 69.5 | 413 | 69.4 | 413 |
| — | 473 | — | 473 | — | 473 | 67.2 | 473 | 67.8 | 473 |
| — | 533 | — | 533 | — | 533 | — | 533 | — | 533 |
| — | 595 | — | 595 | — | 595 | — | 595 | — | 595 |
| — | 871 | — | 871 | — | 871 | — | 871 | 68.5 | 871 |

Figure 5A:
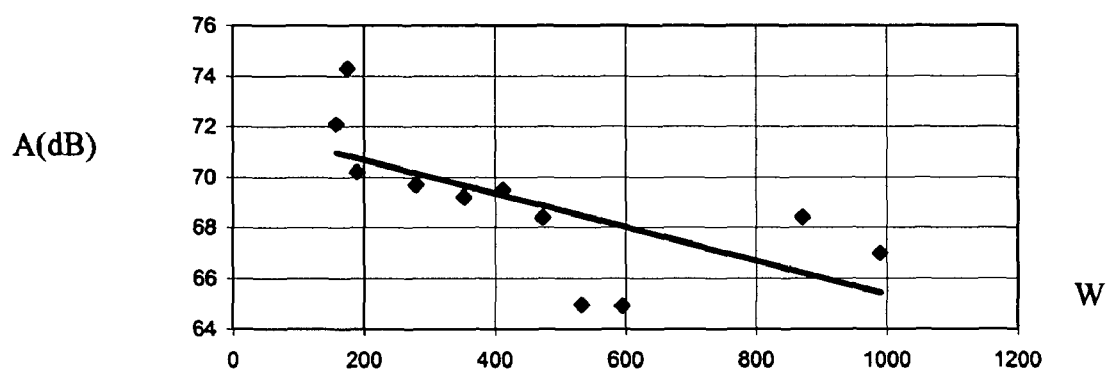
FIG. 5. Dependences of average signal of the operating group of receiving ultrasonic probes $A_{av}$ on the number of charge-discharge cycles of battery W at various charge voltages: a—U=3.5V, b—U=3.6V, c—U=3.7V, d—U=3.8V, e—U=3.9V, f—U=4.0V, g—U=4.1V.
Figure 5B:
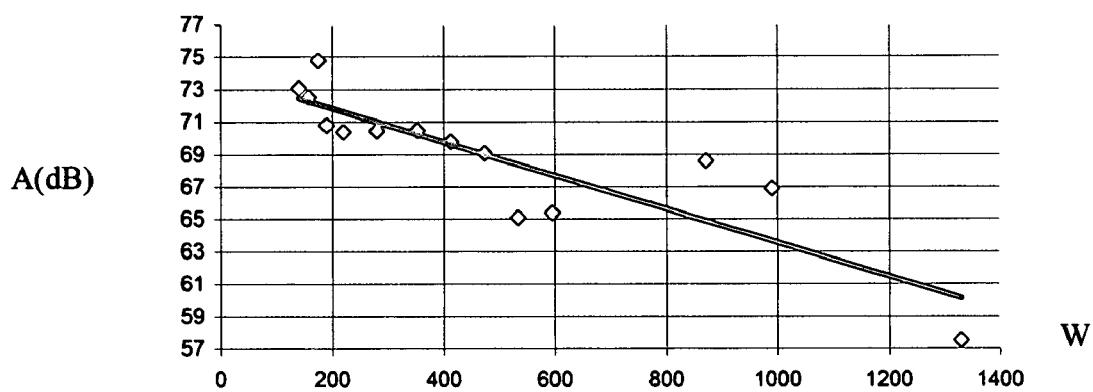
Figure 5C:
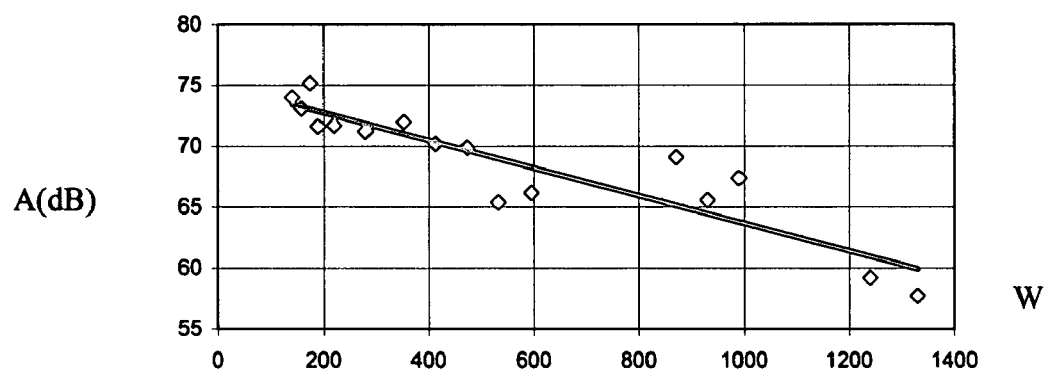
Figure 5D:
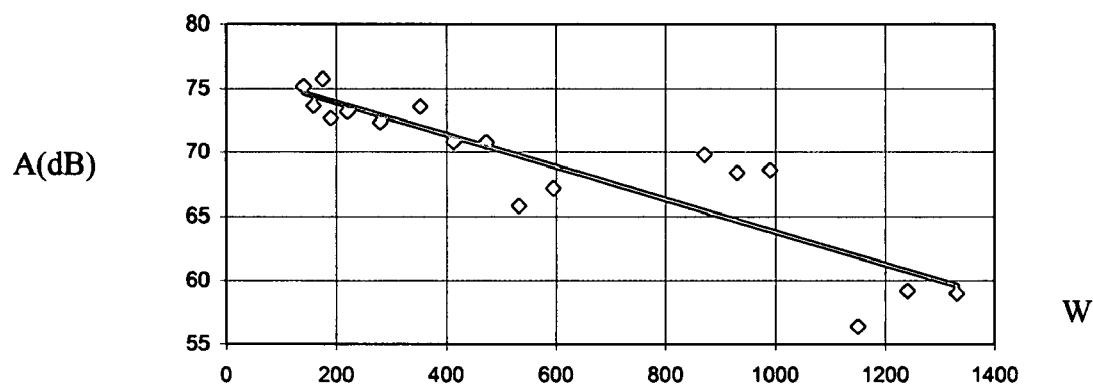
Figure 5E:
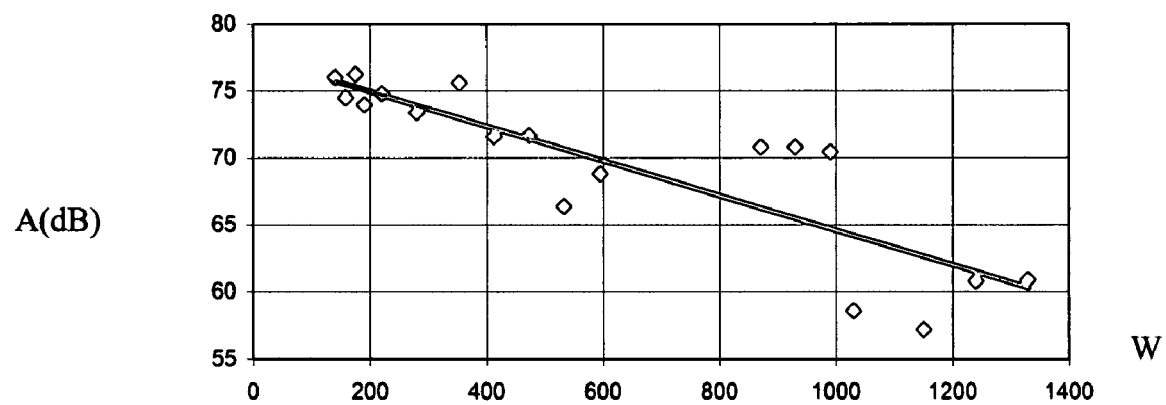
Figure 5F:
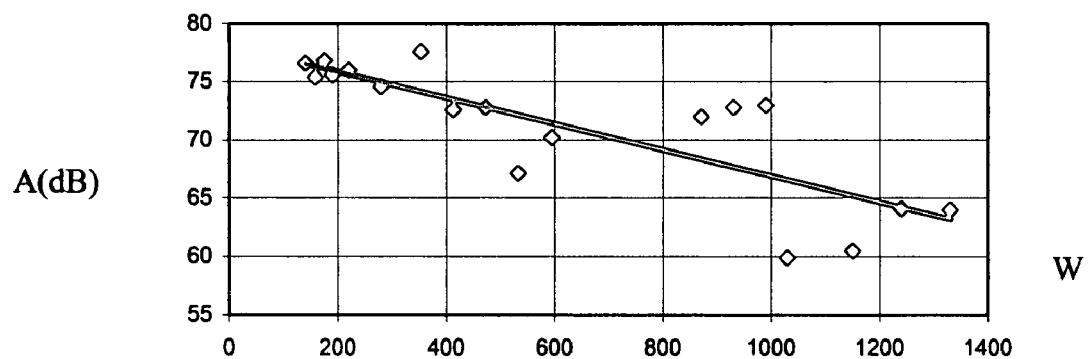
Figure 5G:
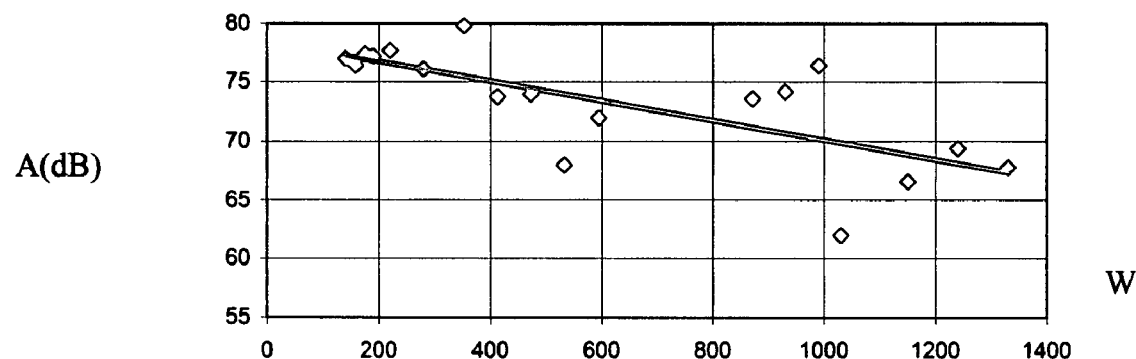

The attenuation of the ultrasonic signal A(dB) that passed through the battery, as a function of the number of the charge—discharge cycles of the battery W when the battery voltages are U=3.5 V is shown in FIG. 5a, U=3.6 V—in FIG. 5b, U=3.7 V—in FIG. 5c, U=3.8V—in FIG. 5d, U=3.9 V—in FIG. 5e, U=4.0 V—in FIG. 5f, U=4.1V—in FIG. 5g. Assuming that all the dependencies shown in FIGS. 5a-g have a linear approximation, and considering that the approximating functions are linear, we determine the slope of the functions of the approximating lines and the correlation coefficients of these dependencies on the battery charge voltage.

TABLE 2

| $U_i(V)$ | | | | | | | | | |
|---|---|---|---|---|---|---|---|---|---|
| 3.5 | | 3.6 | | 3.7 | | 3.8 | | 3.9 | |
| A, dB | W | A, dB | W | A, dB | W | A, dB | W | A, dB | W |
| — | 140 | 73.1 | 140 | 74.0 | 140 | 75.2 | 140 | 76.0 | 140 |
| 72.1 | 158 | 72.52 | 158 | 73.1 | 158 | 73.67 | 158 | 74.5 | 158 |
| 74.3 | 175 | 74.78 | 175 | 75.2 | 175 | 75.75 | 175 | 76.23 | 175 |
| 70.2 | 190 | 70.8 | 190 | 71.6 | 190 | 72.7 | 190 | 74.0 | 190 |
| — | 220 | 70.4 | 220 | 71.7 | 220 | 73.2 | 220 | 74.8 | 220 |
| 69.7 | 280 | 70.45 | 280 | 71.2 | 280 | 72.34 | 280 | 73.4 | 280 |
| 69.2 | 353 | 70.5 | 353 | 72 | 353 | 73.6 | 353 | 75.6 | 353 |
| 69.5 | 413 | 69.8 | 413 | 70.2 | 413 | 70.8 | 413 | 71.6 | 413 |
| 68.4 | 473 | 69.1 | 473 | 69.9 | 473 | 70.8 | 473 | 71.7 | 473 |
| 64.95 | 533 | 65.1 | 533 | 65.4 | 533 | 65.83 | 533 | 66.4 | 533 |
| 64.9 | 595 | 65.4 | 595 | 66.2 | 595 | 67.2 | 595 | 68.8 | 595 |
| 68.4 | 871 | 68.6 | 871 | 69.1 | 871 | 69.8 | 871 | 70.8 | 871 |
| — | 930 | — | 930 | 65.6 | 930 | 68.4 | 930 | 70.8 | 930 |
| 67.0 | 990 | 66.9 | 990 | 67.4 | 990 | 68.6 | 990 | 70.45 | 990 |
| — | 1030 | — | 1030 | — | 1030 | — | 1030 | 58.6 | 1030 |
| — | 1150 | — | 1150 | — | 1150 | 56.4 | 1150 | 57.2 | 1150 |
| — | 1240 | — | 1240 | 59.2 | 1240 | 59.2 | 1240 | 60.8 | 1240 |
| — | 1330 | 57.5 | 1330 | 57.7 | 1330 | 59.0 | 1330 | 60.9 | 1330 |

TABLE 3

| $U_i(V)$ | | | | | |
|---|---|---|---|---|---|
| 4.0 | | 4.1 | | 4.2 | |
| A, dB | W | A, dB | W | A, dB | W |
| 76.6 | 140 | 77.0 | 140 | 77.2 | 140 |
| 75.38 | 158 | 76.4 | 158 | 77.4 | 158 |
| 76.82 | 175 | 77.4 | 175 | 78.4 | 175 |

TABLE 3-continued

| $U_i(V)$ | | | | | |
|---|---|---|---|---|---|
| 4.0 | | 4.1 | | 4.2 | |
| A, dB | W | A, dB | W | A, dB | W |
| 75.6 | 190 | 77.2 | 190 | 79.9 | 190 |
| 76 | 220 | 77.7 | 220 | 79.3 | 220 |
| 74.6 | 280 | 76.1 | 280 | 77.6 | 280 |
| 77.6 | 353 | 79.8 | 353 | 82.2 | 353 |
| 72.6 | 413 | 73.8 | 413 | 75.2 | 413 |
| 72.8 | 473 | 74.0 | 473 | 75.2 | 473 |
| 67.15 | 533 | 68.0 | 533 | 68.95 | 533 |
| 70.2 | 595 | 72.0 | 595 | 74.2 | 595 |
| 72.0 | 871 | 73.6 | 871 | 75.3 | 871 |
| 72.8 | 930 | 74.2 | 930 | 75.2 | 930 |
| 73.0 | 990 | 76.4 | 990 | 80.0 | 990 |
| 59.9 | 1030 | 62.0 | 1030 | 64.8 | 1030 |
| 60.5 | 1150 | 66.6 | 1150 | 75.6 | 1150 |
| 64.1 | 1240 | 69.4 | 1240 | 76.4 | 1240 |
| 64.0 | 1330 | 67.8 | 1330 | 72.8 | 1330 |

Figure 6:
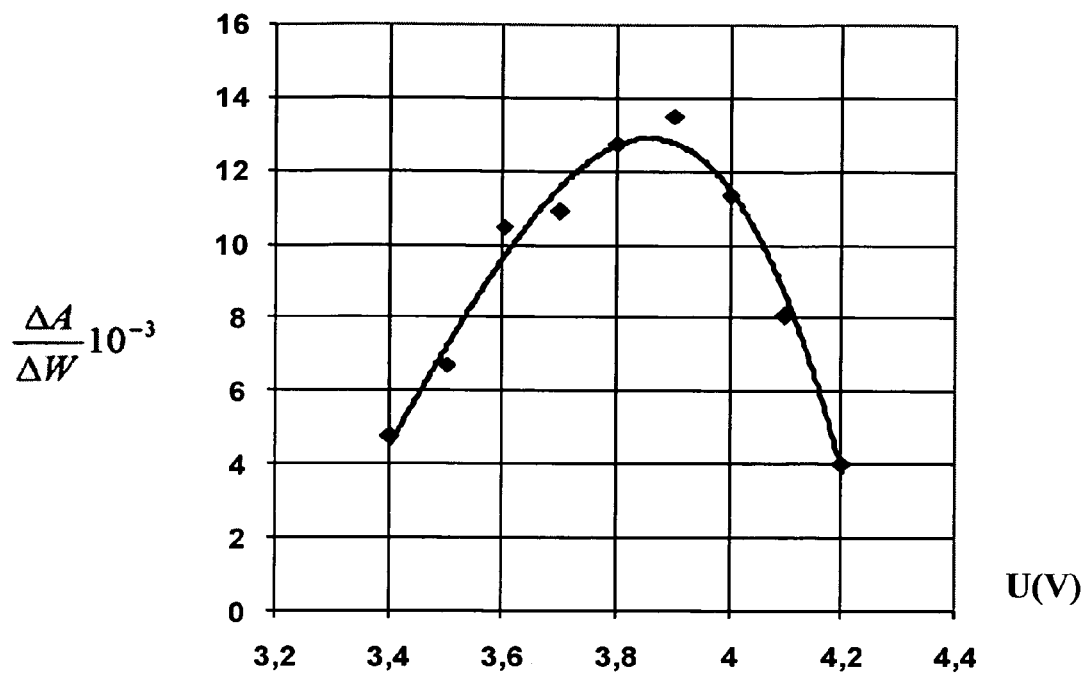
FIG. 6. Dependence of slope of the approximating lines $(\Delta A_{av}/\Delta W) \cdot 10^{-3}$ on test object discharge voltage U(V) (in this case a battery).

The slope dependence of the approximating lines on the battery charge voltage is shown in FIG. 6. The obtained graph shows that it has a vividly expressed extremum character. The maximum slope of the attenuation dependencies of the ultrasonic signal A(dB) that passed through the battery thickness, on the number of charge-discharge cycles of the battery W is observed within the range from 3.8 to 4.0 V. On both sides of this range the slope is quickly reduced.

Figure 7:
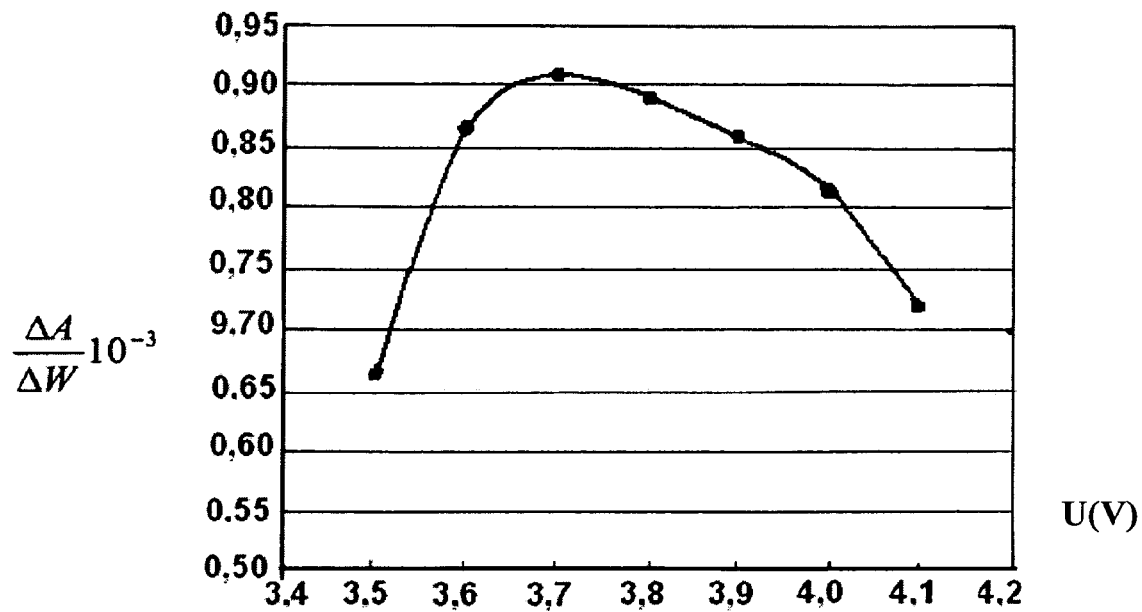
FIG. 7. Dependence of the correlation coefficient for approximating lines $A_{av(i)}=a_i-b_iW$ on test object (battery) charge voltage.

It is possible to calculate the values of the correlation coefficient between the attenuation of the passed ultrasonic signal A(dB) and the number of the <<charge-discharge>> cycles of battery W at different voltage values of battery charging. The obtained dependencies are shown in FIG. 7. The graph in FIG. 7 shows that the correlation coefficient above 0.85 is observed for dependencies A(dB)=F(W) within the charge voltage range from 3.6 to 3.9 V. Therefore, for determination of the calibration characteristic it is necessary to use the dependencies A(dB)=F(W) shown in FIGS. 5 $b,c, d,e$. As this example relates to one rechargeable battery being discussed, its calibration charge voltage is determined by a simple averaging of the charge voltages corresponding to the dependencies of FIGS. 5 $b,c,d,e$. It will equal 3.75 V. The calibration characteristic of the apparatus will be formed by the dependencies that are within the range of 3.65-3.85 V. These dependencies are shown in FIGS. 5 $c,d$. The averaging of the parameters in the specified dependencies gives the following equation of the calibration characteristic: A(dB)= 73.4-0.0119 W.

EXAMPLE 5

Determination of the properties of DSSC solar cell was carried out using the combined ultrasonic and electromagnetic method of the present invention. The surface of each module element of a solar cell was studied using an area equal to the surface of an 8 mm diameter transducer. The attenuation of the ultrasonic oscillations was measured in a shadow mode. Under shadow mode conditions, the transmitting and the receiving acoustic transducers were arranged coaxially on a special stand. In this case the measuring time and the acoustic contact time were recorded.

Hence, the measured amplitude of the received oscillations in dB reflects the properties of the elements interior structure in each region being measured along each module element of a solar cell.

Three structural features in the DSSC were analyzed.
1. Distribution of the electrode structure inside of the case,
2. Entrapped gases or air inside the electrode structure.
3. Distribution of the electrolyte inside of the porous volume of the electrode.

When testing for entrapped air or gasses, analysis of the results showed that, due presence of the impurities of the air in the acoustic path, the amplitude of the receiving ultrasonic signal was decreased by 60%

When determining the distribution of the electrolyte, inside of the porous volume of the electrode, the amplitude of the receiving ultrasonic signal had a non-uniform distribution along the surface of the DSSC. The level of the non-uniformity of the amplitude was up to 24%.

CLOSURE

While various embodiments of the present invention have been shown and described, it will be apparent to those skilled in the art that many changes and modifications may be made without departing from the invention in its broader aspects, including but not limited to, the application of the elements of this invention to determination of remaining service life for such devices as supercapacitors, solar cells fuel cells and the like. The appended claims are therefore intended to cover all such changes and modifications as fall within the true spirit and scope of the invention.

REFERENCES CITED

U.S. Patent Documents

| | | | |
|---|---|---|---|
| 4,259,639 | Mar. 31, 1981 | A. C. M. Renirie a.o. | G01 N 27/42 |
| 4,922,201 | May 01, 1990 | S. N. Vernon | G01 N 27/72 |
| 5,065,084 | Nov. 12, 1991 | Y. Oogita | H01 M10/48 |
| 5,483,165 | Jan. 09, 1996 | D. Cameron | G 01N 27/27 |
| 5,598,101 | Jan. 28, 1997 | W. P. M. Den Dekker | G 01E 31/02 |
| 200,2001,1822 | Jan. 31, 2002 | Sakai, Kenichi | — |
| 2002/0140404A1 | Oct. 03, 2002 | M. J. Lyden | HO2I1/00 |
| 2002/0161537A1 | Oct. 31, 2002 | Sh. Odaohhara | G06F 19/00 |
| 6,750,915B2 | Jan. 15, 2004 | J. Kaku | H04N 5/225 |
| 2004/0024426A1 | Feb. 05, 2004 | M. J. Lyden | A61N 1/37 |

References

1. Nondestructive Evaluation and Quality Control.—Robert L. Stedfeld, Director of Reference. Publ.—Published by The Amer. Society for NDT, Inc., 1978, p. 795.
2. Donald J. Hagemaier. Fundamentals of eddy current testing. Publ.—Published by The Amer. Society for NDT, Inc. 2002, p. 81.
3. D. A. G. Bruggeman.—Berechnung verschiedener phisikalischer Konstanten von heterogenen Substanzen., Ann. Phys., 24, 636-679, 1935.
4. J. Matauschek.—Einführug in die Ultraschaltechnik. VEB Verlagtechnik, Berlin. 1960.

We claim:
1. An apparatus for determining the service life of an electrochemical energy device test object comprising:
   a plurality of ultrasonic transmitting and receiving ultrasonic probes, said probes being preferably arrayed in pairs, with one probe of each pair placed on one side of a test object while the other probe of the same pair is placed directly opposite the said one probe on the opposite side of said test object;

means for matching an acoustic resistance of the probes with the test object;

means for positioning the transmitting and the receiving probes relative to each other;

means for measuring a test object thickness;

means for alignment of the probes of the receiving array;

means for measuring an amplitude of the ultrasonic pulse that passed through the test object, for each pair of the transmitting and receiving probes, the amplitude being normalized to the test object thickness;

means for comparing normalized signals of the receiving probes to one another and selecting the pairs of the transmitting and receiving probe pairs that perform scanning of a test object operating region;

means for performing calibration;

means for bringing an operational state of said test object being tested to correspondence with a calibrating value;

means for analyzing and averaging the normalized signals from the receiving probes;

means for using the analyzed and averaged signals produced by said receiving probes for determining the remaining lifetime of said electrochemical energy device test object.

2. An apparatus according to claim 1, wherein the ultrasonic probes of the transmitting and the receiving arrays are arranged at vertices of a square, while a distance between the axes of symmetry of the probes within an array plane does not exceed a probe diameter by more than a factor of two.

3. An apparatus according to claim 1 wherein the means for matching the acoustic resistance of the probes to the test object is a polyurethane tip having a shape of short cylinders of identical diameter and height, said polyurethane tip being glued to an operating end faces of the transmitting and the receiving ultrasonic probes while preserving the common symmetry axis of each probe with the tip.

4. An apparatus according to claim 3, wherein said tip are made of polyurethane of 18-20 Shore's hardness units, and are glued to the operating end face of the probe with a polyurethane adhesive to provide an acoustic transparency between the tip and the operating interface surface of the probe.

5. An apparatus according to claim 3, wherein the diameter of said polyurethane tip is equals the diameter of the probe and the height of the tip is between approximately 3 and 8 cm.

6. An apparatus according to claim 1 wherein the means for positioning transmitting and the receiving ultrasonic probes relative to one another in the horizontal plane within a specified displacement range comprises:

four transformer-type induction probes with ferrite cores, excitation coils of which are arranged in the corners of the transmitting array while sensing coils are arranged in corresponding positions in the receiving array;

pairs of excitation (transmitting) and sensing (receiving) coils having a common symmetry axis when the arrays are precisely aligned, such that the coincidence of the symmetry axes is achieved for all pairs of the transmitting and the receiving ultrasonic probes;

a mechanism for shifting the transmitting array relative to the receiving array in the plane parallel to the plane of the arrays within a specified displacement range;

electronic means for controlling and indicating the shifting of the transmitting array such that the transmitting and the receiving ultrasonic probe pairs are co-axial;

electronic means for determining the signal voltage when the symmetry axes of all pairs of the transmitting and receiving ultrasonic probes are best aligned.

7. An apparatus according to claim 6, wherein the excitation coils of all the four transformer-type probes are connected parallel to an outlet of a harmonic signal generator.

8. An apparatus according to claim 6, wherein a voltage measuring circuit is connected to each sensing coil of the transformer-type probes.

9. An apparatus according to claim 1, wherein the means for the measuring test object thickness comprises:

two miniature platforms made of a high-frequency dielectric material, one platform of which is placed between four transmitting ultrasonic probes arranged in vertices of an array central square while the other said platform is arranged between said receiving ultrasonic probes, the plane of the platforms being perpendicular to a cylinder generatrix of cylindrically shaped probes;

two eddy current sensors in the form of short cylindrical induction coils each of the coils being affixed in the center of its platform, the generatrix of each coil cylinder being perpendicular to the plane of the platform;

two capacitors, each being affixed to their respective platforms and connected by their respective outputs to the outputs of the corresponding induction coil;

communication elements of a parallel oscillation circuit formed on each platform with high-frequency signal generators.

10. An apparatus according to claim 9, wherein each parallel oscillation circuit is arranged on the corresponding platform is connected to the output of a high-frequency signal generator by means of a communication element.

11. An apparatus according to claim, 9 wherein a metering circuit is connected to each oscillation circuit, an output signal of which is determined by a gap value (distance) between an operating end face of short cylindrical induction coil and a surface of the foil forming the surface of the test object.

12. An apparatus according to claim 1, wherein the means for measuring the test object thickness includes:

means for analog-to-digital voltage transformation of a positioning system sensing coils;

means for analog-to-digital conversion of the output signals of eddy current sensor measuring circuits;

computation means for determining the voltage maximum values for sensing induction coils;

computation means for averaging the voltage maximum values of four positioning system sensing coils;

computation means for determining a distance between the arrays of the transmitting and receiving ultrasonic probes according to an average of the voltage maximum values of said four positioning system sensing coils;

computation means for determining the gap values between operating end faces of short cylindrical induction coils arranged in the centers of the arrays of the transmitting and receiving ultrasonic probes, and opposite flat surfaces of the test object body;

computation means for determining the test object thickness.

13. An apparatus according to claim 1, wherein a metering circuit is connected to each receiving ultrasonic probe while the transmitting ultrasonic probes are connected to an output of the excitation signal generator.

14. An apparatus according to claim 12 containing a means for normalizing the amplitude, as a function of the test object thickness, of the ultrasonic pulses that pass through the test object and are recorded by each metering circuit.

15. A method for determining the service life of an electrochemical energy device test object according to claim 1, comprising:

placing said test object, onto an array of the receiving ultrasonic probes such that lateral edges of the receiving ultrasonic probes are parallel to the lines connecting the symmetry centers of the probes;

placing an array of the transmitting probes on the top surface of said test object by means of guides;

positioning the array of the transmitting ultrasonic probes relative to the array of the receiving probes in the plane parallel to the planes of the arrays until the symmetry axes are coincidence for all pairs of the transmitting and receiving probes;

measuring of a test object thickness;

alignment of the transmitting array ultrasonic probes;

comparing to each other signals of the receiving ultrasonic probes;

selecting an operating group of pairs of the transmitting and receiving ultrasonic probes that perform scanning within an operating region of the test object;

amplitude normalization of the ultrasonic pulse that passed through the test object thickness for each pair of the transmitting and receiving probes, against the test object thickness;

calibration of the signal values whereby the signal passed through the test object;

bringing an operational state of the test object being studied in correspondence with the calibration value;

analyzing normalized signals of the receiving probes of the operating group;

forming a resulting signal of the receiving probes of the operating group for the test object;

determining the remaining lifetime of said test object by consideration of the signal values thus obtained.

16. A method according to claim 15, wherein the alignment of the transmitting ultrasonic probes is performed in sequence, along each line of the array, while the signals of the receiving probes are converted to a digital form and stored.

17. A method according to claim 15, wherein a normalized digital signal from each receiving probe in the array is compared to the signals of all the neighboring probes located in the same array at a distance equal to the side length of square.

18. A method according to claim 15, wherein, according to the signal comparison results of the ultrasonic probes whereby the signal passed through the test object, an operating group is selected from the pairs comprised of the transmitting and receiving probes that effect direct probing of the test object operating region excluding from the total probe pairs set those pairs that are located beyond the test object, and those pairs that are close to the lateral edge of the test object.

19. A method according to claim 15, including the step of calibrating the apparatus from the group of a given type of test objects, a randomly selected calibration set is formed, including at least 10 test objects, each of which is subjected to cycling.

20. A method according to claim 15 wherein, after each cycling stage of the test object comprised of a constant number (50-100) of test object charge-discharge cycles, the normalized signals of the receiving probes operating group are determined at various test object operational state values.

21. A method according to claim 15, wherein the number of charge voltage gradations after each cycling stage of the test object does not exceed 10, while the charge voltage values are uniformly arranged within the range from the fully charged to the fully discharged, and are not changed from one cycling stage to another.

22. A method according to claim 15 wherein the average operating group signals value and the rms error value are determined for each test object from the calibration group after each cycling stage of the test object at each charge voltage value.

23. A method according to claim 15 wherein a two-dimensional set of rms errors is formed for each test object for all cycling stages of the test object and all charge voltage values used for test object charging after each stage.

24. A method according to claim 23, wherein an analysis of elements in the set is performed, and the test object for which rms error value exceeds 10%, are excluded from calibration set.

25. A method according to claim 24, wherein, for each test object from the calibration set, the correlation coefficients are determined as a function of the averaged signal of a operating set of the receiving ultrasonic probes, and the number of cycling stages at each charge voltage value.

26. A method according to claim 15, wherein for each test object from the calibration set the average slope of the dependency between the averaged signal of the operating set of the receiving ultrasonic probes and the number of cycling stages of the test object is determined at each charge voltage value.

27. A method according to claim 15, wherein a correlation coefficient of which is not less than 0.85 for each test object.

28. A method according to claim 15, wherein the charge voltage is recorded for each selected dependency, while a weighted average charge voltage value in a calibration set is determined, and is accepted as the calibration value.

29. A method according to claim 15, including the step of selecting dependencies having voltage values within the range of ±0.1 V relative to the calibration value wherein, from the group of dependencies with the maximum average slope, thereby using these dependencies to form the averaged dependence, used as the calibration characteristic of the apparatus.

30. A method according to claim 15, wherein a charge voltage of the test object being tested is set to the calibration value.

31. A method according to claim 15, wherein a three-dimensional approximating dependence or a regression surface is built according to the normalized signals of the receiving probes of the operating set, related to the Cartesian coordinates of these probes in the plane of the test object being tested, using the least-squares method.

32. A method according to claim 31, wherein average value of the regression surface is determined.

33. A method according to claim 32, wherein a deviation of the regression surface of the test object from the average value is determined, and if the extremum values of the deviation go beyond 30%, then the remaining test object service life is calculated according to the minimum value of the signal.

34. A method according to claim 32, wherein the number of charge-discharge cycles of the test object since the beginning of the operation of the test object is determined according to average surface regression level of extremum value of the test object, which does not exceed a 30% deviation from the average value of the test object.

35. A method according to claim 34, wherein the remaining number of re-charge cycles of the test object is determined by subtracting the number of the recharge cycles that the test object has undergone since the beginning of operation of the test object from predetermined number of recharge cycles of the test object.

36. A method according to claim 15 wherein the test object is a battery.

37. A method according to claim 15, wherein the test object is a DSSC photovoltaic cell.

38. A method according to claim 15 wherein the test object is an electric double layer capacitor.

* * * * *